United States Patent
Hammons, Jr.

(10) Patent No.: US 8,665,756 B2
(45) Date of Patent: Mar. 4, 2014

(54) SYSTEM AND METHOD FOR TOPOLOGY OPTIMIZATION OF DIRECTIONAL NETWORK

(75) Inventor: A. Roger Hammons, Jr., North Potomac, MD (US)

(73) Assignee: The Johns Hopkins University, Baltimore, MD (US)

( * ) Notice: Subject to any disclaimer, the term of this patent is extended or adjusted under 35 U.S.C. 154(b) by 139 days.

(21) Appl. No.: 13/329,790

(22) Filed: Dec. 19, 2011

(65) Prior Publication Data

US 2012/0155330 A1    Jun. 21, 2012

Related U.S. Application Data

(60) Provisional application No. 61/424,850, filed on Dec. 20, 2010.

(51) Int. Cl.
*H04L 12/28* (2006.01)

(52) U.S. Cl.
USPC ............................ 370/255; 370/256; 370/406

(58) Field of Classification Search
USPC ......... 370/254, 255, 256, 338, 406, 251, 912, 370/431, 400, 235, 328
See application file for complete search history.

(56) References Cited

U.S. PATENT DOCUMENTS

| | | | |
|---|---|---|---|
| 6,782,403 B1 * | 8/2004 | Kino et al. ............................ | 1/1 |
| 6,791,949 B1 | 9/2004 | Ryu et al. | |
| 7,031,321 B2 | 4/2006 | Habetha | |
| 7,333,458 B2 * | 2/2008 | Cain ............................ | 370/337 |
| 7,844,687 B1 | 11/2010 | Gelvin et al. | |
| 7,911,978 B1 | 3/2011 | Chandra et al. | |
| 7,983,150 B2 | 7/2011 | Bruckman et al. | |
| 8,018,874 B1 | 9/2011 | Owechko | |
| 2002/0044533 A1 * | 4/2002 | Bahl et al. ..................... | 370/255 |
| 2002/0172157 A1 * | 11/2002 | Rhodes .......................... | 370/238 |
| 2003/0095504 A1 * | 5/2003 | Ogier ............................ | 370/235 |
| 2003/0101253 A1 * | 5/2003 | Saito et al. ..................... | 709/223 |
| 2003/0174651 A1 * | 9/2003 | Morton .......................... | 370/235 |
| 2003/0214914 A1 * | 11/2003 | Cain ............................ | 370/252 |
| 2004/0022272 A1 * | 2/2004 | Rodman et al. ............... | 370/494 |
| 2004/0170151 A1 * | 9/2004 | Habetha ........................ | 370/338 |
| 2005/0078672 A1 * | 4/2005 | Caliskan et al. .............. | 370/389 |
| 2005/0094585 A1 * | 5/2005 | Golden et al. ................. | 370/310 |
| 2006/0142020 A1 * | 6/2006 | Mueckenheim et al. ...... | 455/453 |
| 2006/0291580 A1 * | 12/2006 | Horvitz ......................... | 375/265 |
| 2008/0013480 A1 * | 1/2008 | Kapoor et al. ................ | 370/328 |
| 2008/0056292 A1 * | 3/2008 | Hong et al. ................... | 370/431 |
| 2008/0198865 A1 * | 8/2008 | Rudnick et al. ............... | 370/406 |
| 2009/0010164 A1 * | 1/2009 | Wang et al. ................... | 370/235 |

(Continued)

FOREIGN PATENT DOCUMENTS

EP    1610503    12/2005

*Primary Examiner* — Ian N Moore
*Assistant Examiner* — Phong La
(74) *Attorney, Agent, or Firm* — Noah J. Hayward

(57) ABSTRACT

The present invention includes a system and method by which a network of directional, wireless nodes that are not fixed in space can be optimized by optimizing each node individually. The network does not have a central control node, so each node is responsible for optimizing its surrounding topology. This is accomplished by synthesizing incoming information from neighboring nodes and determining which nodes will provide the best connections based on specific utilities each node is attempting to optimize. Neighboring nodes then exchange messages to request, accept, or reject directional connections between them based on their preferred optimizations. The overall directional network topology is achieved by consensus driven by local preferences.

9 Claims, 14 Drawing Sheets

(56) References Cited

U.S. PATENT DOCUMENTS

| | | | |
|---|---|---|---|
| 2009/0327444 A1* | 12/2009 | Archer et al. | 709/212 |
| 2010/0202322 A1* | 8/2010 | Cai et al. | 370/254 |
| 2010/0265955 A1* | 10/2010 | Park et al. | 370/400 |
| 2010/0309844 A1 | 12/2010 | Wang et al. | |
| 2011/0286421 A1* | 11/2011 | Hu | 370/329 |
| 2012/0220278 A1* | 8/2012 | Soma et al. | 455/414.2 |
| 2012/0236865 A1* | 9/2012 | Jia | 370/392 |
| 2013/0086551 A1* | 4/2013 | Archer et al. | 717/113 |

* cited by examiner

SYSTEM AND METHOD FOR TOPOLOGY OPTIMIZATION OF DIRECTIONAL NETWORK

CROSS-REFERENCE TO RELATED APPLICATION

This application claims priority to and the benefit of prior-filed, U.S. Provisional Application No. 61/424,850, filed Dec. 20, 2010, the content of which is herein incorporated by reference in its entirety.

BACKGROUND OF THE INVENTION

1. Field of the Invention

The present invention relates generally to communication networks and, more particularly, to topology-optimized networks that include directional, wireless nodes that are not fixed in space.

2. Description of the Related Art

A communication network typically includes a collection of hardware components interconnected by communication channels that provides for sharing of resources and information. Each point in the communication channel where data can be received and/or transmitted is referred to as a node. In a computer network, a node may be a modem, bridge, switch or host computer. In a cellular telecommunications network, a node may be the base station controller, home location register or GPRS support nodes. Network topology, or the interconnections of nodes within a network, may be optimized in different ways. For example, a network may be optimized to route information in the shortest amount of time or in a way that minimizes the overall power drain on the network.

Nodes may be wired or wireless. Wired nodes are connected with other nodes via a wired connection. Examples of wired nodes include land line telephones and computers connected to a network via an Ethernet cable. A wireless node is a node that is connected with other nodes via a wireless connection. Examples of wireless nodes include cellular telephones and computers connected to a network via a wireless connection.

An example conventional wired network will now be described with reference to FIGS. 1-2.

FIG. 1 illustrates a conventional network 100 of wired communication nodes fixed in space.

As shown in the figure, nodes 102-126 are connected to each other via communication channels 128-178. In this configuration, there are many different paths by which information can be shared between nodes 102-126. For example, node 102 may connect with node 110 via communication channels 146, 152, and 158. Alternatively, node 102 may connect with node 110 via communication channels 144, 168, 176 and 160. It can be appreciated that a connection between any pair of nodes 102-126 may be accomplished by a number of different paths that travel along communication channels 128-178.

A central control node 102 contains all of the information about the network via communications with the other nodes in network 100. Typically, central control node 102 will monitor all other nodes in the network by polling the other nodes for information at predetermined intervals. Central control node 102 controls the path of information through the network by optimizing parameters such as connectivity, power consumption, network traffic, or other parameters known in the art. In an example scenario, central control node 102 may route information through conventional network 100 in such a way to minimize communication time between nodes 104 and 114. This will be described in more detail with reference to FIG. 2.

FIG. 2 illustrates an optimal connection path 200 between the wired communication nodes of network 100 of FIG. 1.

As shown in FIG. 2, connection path 200 is imposed by central control node 102 based on optimizing parameters such as connectivity, power consumption, network traffic, or other parameters known in the art. In an example scenario, central control node 102 routes information via connection path 200 in order to minimize communication time between nodes 104 and 114. Information can flow between nodes 104 and 114 in one of two paths. Path one comprises communication channels 148, 150, 132, 156, 158, 136, 162, and 164. Path two comprises communication channels 128, 144, 168, 166, and 140. Other communication channels and nodes from FIG. 1 are not shown because central control node 102 prevents communication through those nodes and along those communication channels.)

Similar network optimization is conventionally performed for wireless networks. This will be described in greater detail with reference to FIGS. 3-4.

FIG. 3 illustrates a conventional network 300 of wireless communication nodes fixed in space.

As shown in the figure, nodes 302-326 are connected to each other via communication channels 328-352. In this configuration, there are many different paths by which information can be shared between nodes 302-326. For example, node 302 may connect with node 318 via communication channels 352, 336, and 340. Alternatively, node 102 may connect with node 110 via communication channels 350, 348, and 344. It can be appreciated that a connection between any pair of nodes 302-326 may be accomplished by a number of different paths that travel along communication channels 328-352.

A central control node 302 contains all of the information about the network via communications with the other nodes in network 300. Typically, central control node 302 will monitor all other nodes in the network by polling the other nodes for information at regular, known intervals. Central control node 302 controls the path of information through the network based on optimizing parameters such as connectivity, power consumption, network traffic, or other parameters known in the art. In an example scenario, central control node 302 may route information through conventional wireless network 300 in such a way to minimize communication time between nodes 304 and 318. This will be described in more detail with reference to FIG. 4.

FIG. 4 illustrates an optimal connection path 400 between the wireless communication nodes of network 300 of FIG. 3.

As shown in FIG. 4, connection path 400 is imposed by central control node 302 based on optimizing parameters such as connectivity, power consumption, network traffic, or other parameters known in the art. In an example scenario, central control node 302 routes information via connection path 400 in order to minimize communication time between nodes 304 and 318. Information can flow between nodes 304 and 318 in one of many paths. One path comprises wireless communication channels 354, 334, and 344. Another path comprises wireless communication channels 346 and 344. Other paths between nodes 304 and 318 are possible based on other combinations of wireless communication channels 334, 344, 346 and 354, however all paths are optimal paths based on the objective to minimize communication time between nodes 304 and 318. Other communication channels from FIG. 3 are not shown because central control node 302 prevents communication along those communication channels.

A conventional communication network may include a mixture of wired nodes, as described above with reference to FIGS. 1-2, and wireless nodes, as described above with reference to FIGS. 3-4. Additionally, a central control node may be either wired or wireless, so long as it has the ability to monitor all nodes within the network in order to optimize performance based on predetermined parameters.

A wireless node may be directional or non-directional. A non-directional, wireless node is one that broadcasts its signal without directionality, such that any other node within a 360 degree radius, and within the broadcast area, can receive the signal. A directional, wireless node is one that broadcasts its signal with directionality, such that another node must be within a radius that is less than 360 degrees, and within the broadcast area, in order to receive the signal. The direction in which a directional node transmits its signal is not fixed; the direction can be changed to reach other nodes in other areas.

A conventional communication system may include a mixture of wired, non-directional wireless and directional wireless nodes. This will be described with reference to FIGS. 5-6.

FIG. 5 illustrates a conventional network 500 of wired, non-directional wireless and directional wireless communication nodes fixed in space.

As shown in the figure, nodes 502 and 506 are directional wireless nodes. The wireless signals 504 and 508 of nodes 502 and 506, respectively, are not broadcast 360 degrees from nodes 502 and 506. Instead, wireless signals 504 and 508 are broadcast in a specific direction. For example, wireless signal 504 can reach wired node 512 but it cannot reach wired node 514 based on the current orientation of wireless signal 504. The direction of wireless signals 504 and 508 can be changed, so wireless signals 504 and 508 may reach different nodes at different times.

Node 510 is a non-directional wireless node that is the central control node of network 500. As shown in the figure, wireless signal 516 of node 510 is broadcast 360 degrees from node 510. In contrast to wireless signals 504 and 508, wireless signal 516 does not require rotation in order to reach other nodes within its broadcast area. Central control node 510 controls the path of information through the network by optimizing parameters such as connectivity, power consumption, network traffic, or other parameters known in the art.

There may be situations where a directional node is not fixed in space, but is mobile. In such situations, it may not be possible to continuously optimize a network having moving nodes, as it may not be possible for the central control node to communicate with such nodes at all times. This will be described in greater detail with reference to FIG. 6.

FIG. 6 illustrates network 500 of FIG. 5 where wireless, directional node 502 is not fixed in space, but is mobile.

As shown in FIG. 6, while node 502 is in communication with, for example, nodes 512 and 514 via wireless signal 504, central control node 510 still contains all of the global information about the network, including the physical location of node 502. However, when wireless signal 504 is directed away from the rest of the nodes in network 500, central control node 510 does not have any information regarding node 502, including its physical location, and is therefore unable to compute an optimal information path or optimal node topology using all of the nodes in network 500.

The lack of communication between nodes described above is undesirable, and a conventional network utilizing a central control node does not provide for topology optimization of a network that includes directional, wireless nodes that are not fixed in space.

What is needed is a system and method to allow for topology optimization of a network that includes directional, wireless nodes that are not fixed in space.

SUMMARY OF THE INVENTION

The present invention provides a system and method for topology optimization of a network that comprises directional, wireless nodes that are not fixed in space.

The present invention includes a directional communication node for use with a first communication node and a second communication node. The first communication node is located at a first position and transmits first topology information related to the first communication node, and the second communication node is located at a second position and transmits second topology information related to the second communication node. The directional communication node includes a directional transmitting portion, a receiving portion, a parameter determining portion and an optimization portion. The directional transmitting portion transmits a first output signal in a first direction toward the first communication node and outputs a second output signal in a second direction toward the second communication node. The receiving portion receives the first topology information and the second topology information. The parameter determining portion determines a first communication channel value and a second communication channel value. The first communication channel value is based on the first topology information and the second communication channel value is based on the second topology information. The optimization portion determines an optimized communication path based on the first communication channel value and the second communication channel value. The optimization portion generates a connection instruction based on the optimized communication path. The directional transmitting portion further establishes a first communication channel with one of the first communication node and the second communication node based on the connection instruction.

BRIEF DESCRIPTION OF THE DRAWINGS

The above and other aspects, features and advantages will become more readily apparent from the following detailed description of the invention, accompanied by the drawings, in which.

DETAILED DESCRIPTION

One or more exemplary embodiments of the present invention include a system and method by which a network of directional, wireless nodes that are not fixed in space can be optimized by optimizing each node individually. In a preferred embodiment, the network does not have a central control node, so each node is responsible for optimizing its surrounding topology. This is accomplished by synthesizing incoming information from neighboring nodes and determining which nodes will provide the best connections based on specific utilities each node is attempting to optimize. Neighboring nodes then exchange messages to request, accept, or reject directional connections between them based on their preferred optimizations. The overall directional network topology is achieved by consensus driven by local preferences.

The directionality of this type of network provides for a constantly changing topology, since the nodes can move in space, and the direction in which the signal from each node is broadcast changes as well. Therefore, a node goes through a cyclic process of surveying its surroundings, making new connections and breaking old connections based on updated information, then beginning the process again by surveying its surroundings.

Embodiments of the present invention as discussed above will now be described in greater detail with reference to FIGS. 7-15.

Figure 1:
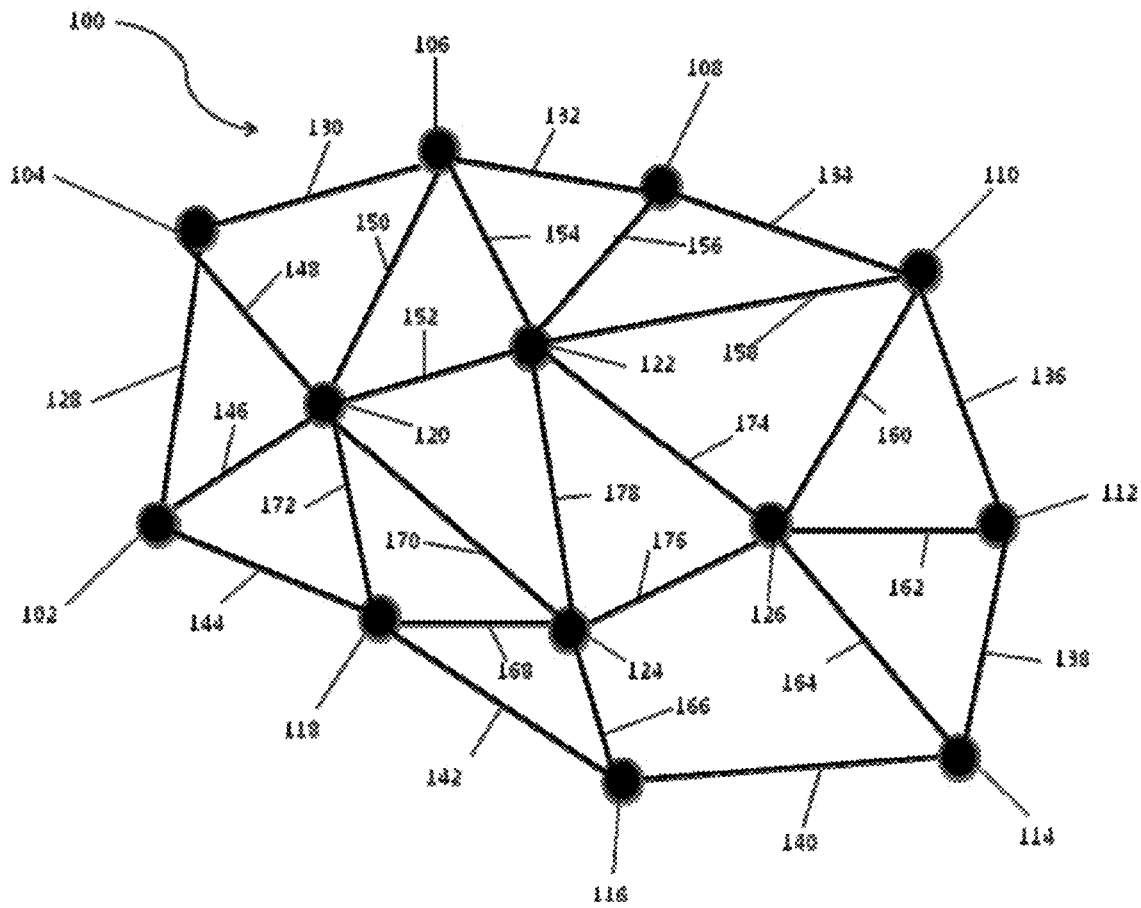
FIG. 1 illustrates a conventional network of wired communication nodes fixed in space.
Figure 2:
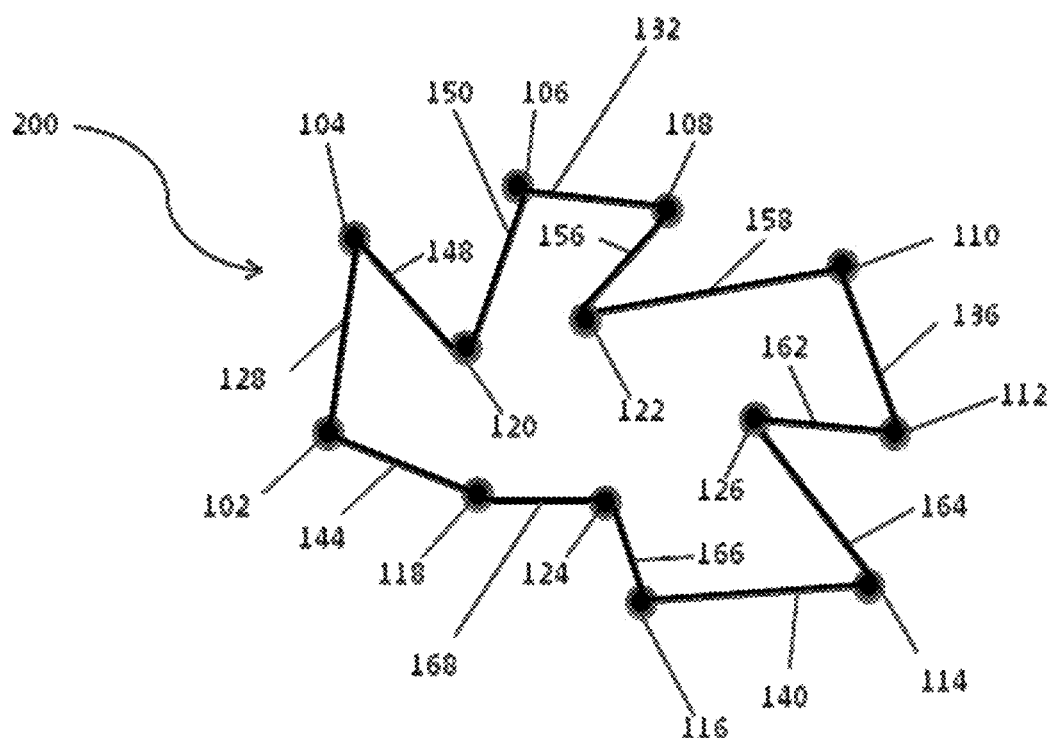
FIG. 2 illustrates an optimal connection path between the wired communication nodes of FIG. 1.
Figure 3:
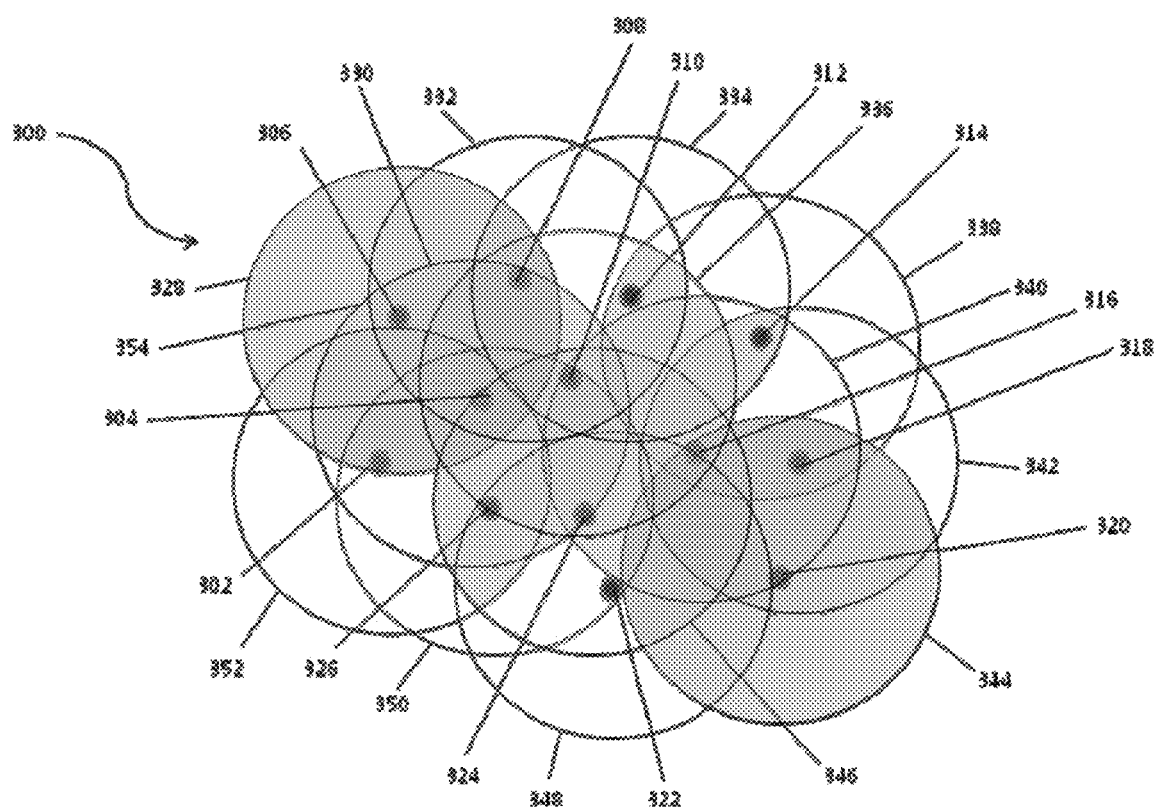
FIG. 3 illustrates a conventional network of wireless communication nodes fixed in space.
Figure 4:
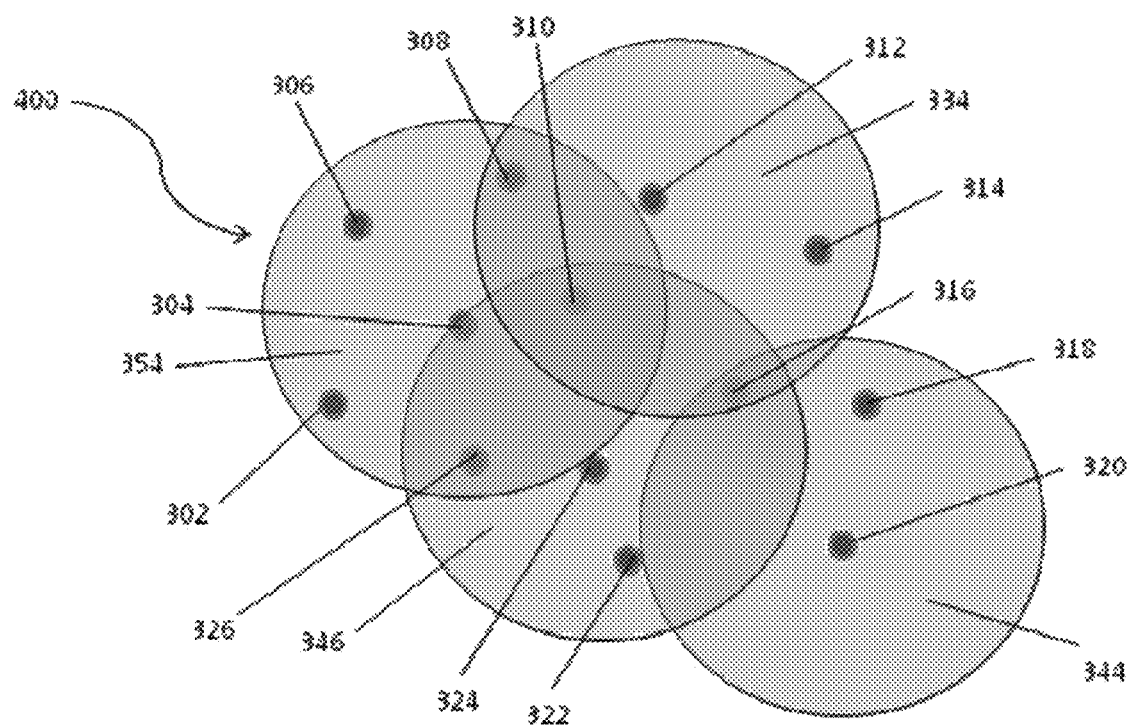
FIG. 4 illustrates an optimal connection path between the wireless communication nodes of FIG. 3.
Figure 5:
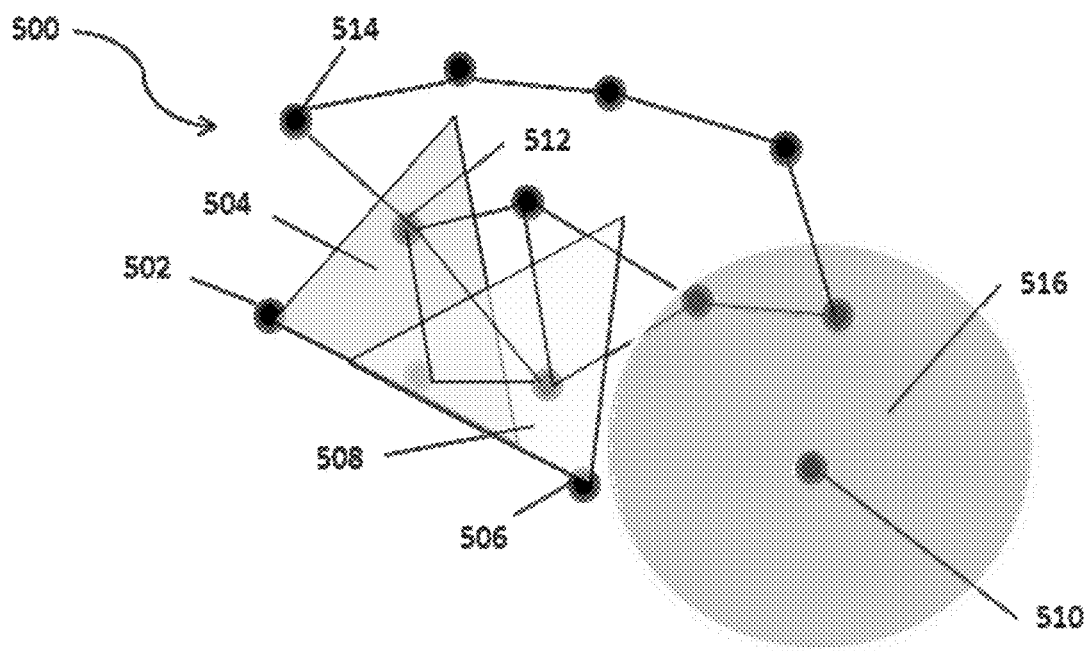
FIG. 5 illustrates a conventional network of wired and wireless communication nodes fixed in space.
Figure 6:
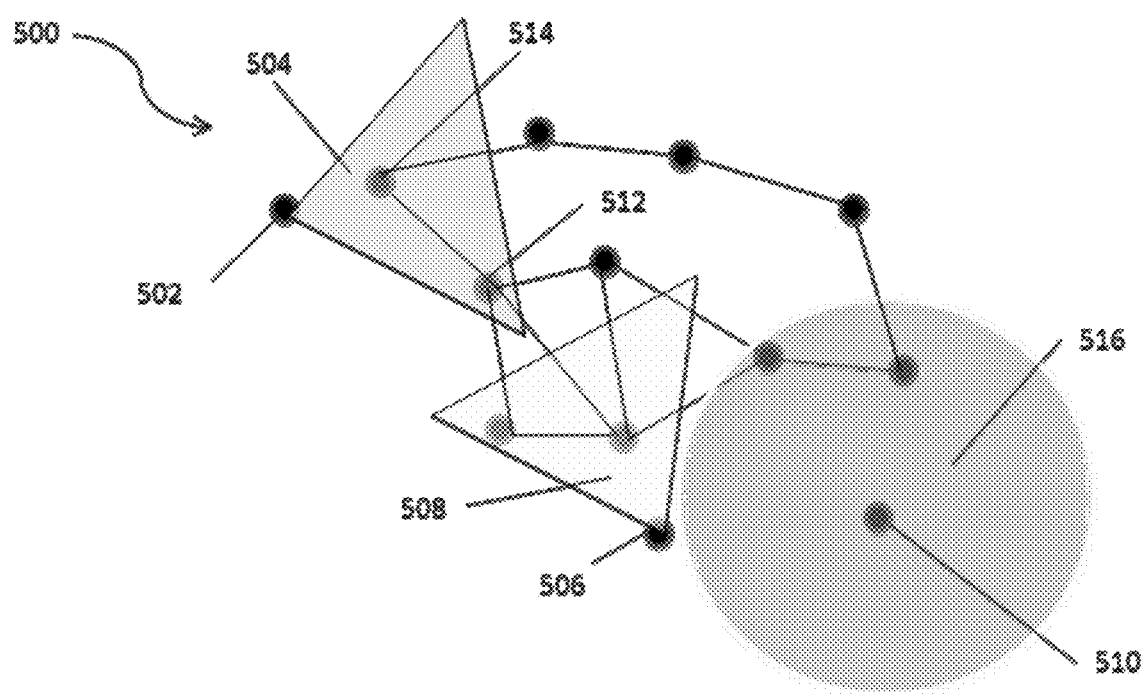
FIG. 6 illustrates the network of FIG. 5 where at least one wireless communication node is not fixed in space.
Figure 7:
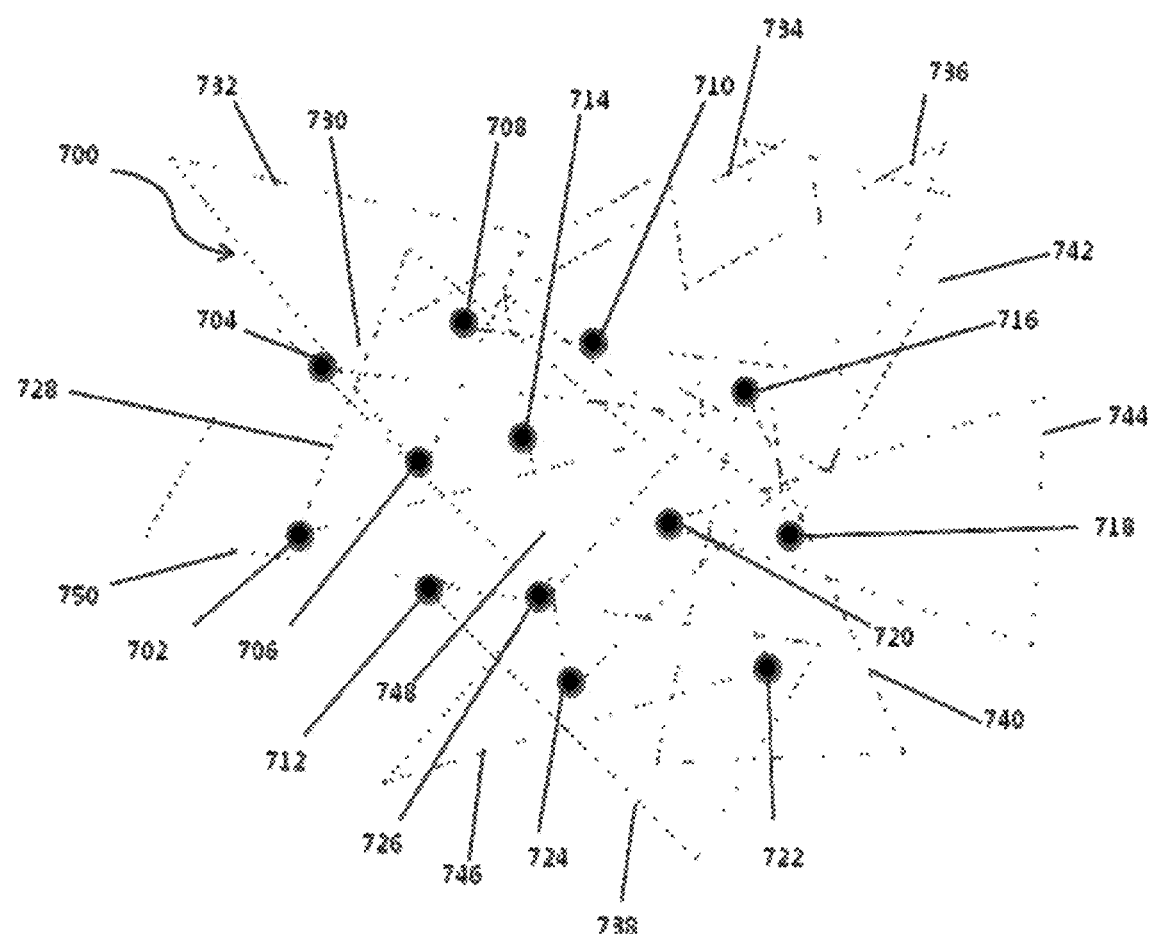
FIG. 7 illustrates a network of directional, wireless communication nodes that are not fixed in space in accordance with the present invention.

FIG. 7 illustrates a network 700 of directional, wireless communication nodes in accordance with aspects of the present invention, at a time $t_0$.

As shown in FIG. 7, network 700 includes directional, wireless communication nodes 702-726 that broadcast wireless signals communication channels 728-750. A sample of the directional communications is shown by node 702 and node 704. Node 702 is operable to transmit along an arc indicated by triangle 728, and the signal can reach nodes 706, 708, and 714. Node 704 is operable to transmit along an arc indicated by triangle 730, and the signal can reach nodes 708 and 710.

In order for information to be transmitted from, for example, node 702 to node 718, information may travel from node 702 to node 708 via wireless communication channel 728, then from node 708 to node 710 via wireless communication channel 734, then from node 710 to node 716 via wireless communication channel 736, then from node 716 to node 718 via wireless communication channel 740. There is no central control node in network 700 to control the topology of nodes 702-726. Instead, each individual node is in control of optimizing its own local topology. This will be further described with reference to FIGS. 10-15.

Figure 8:
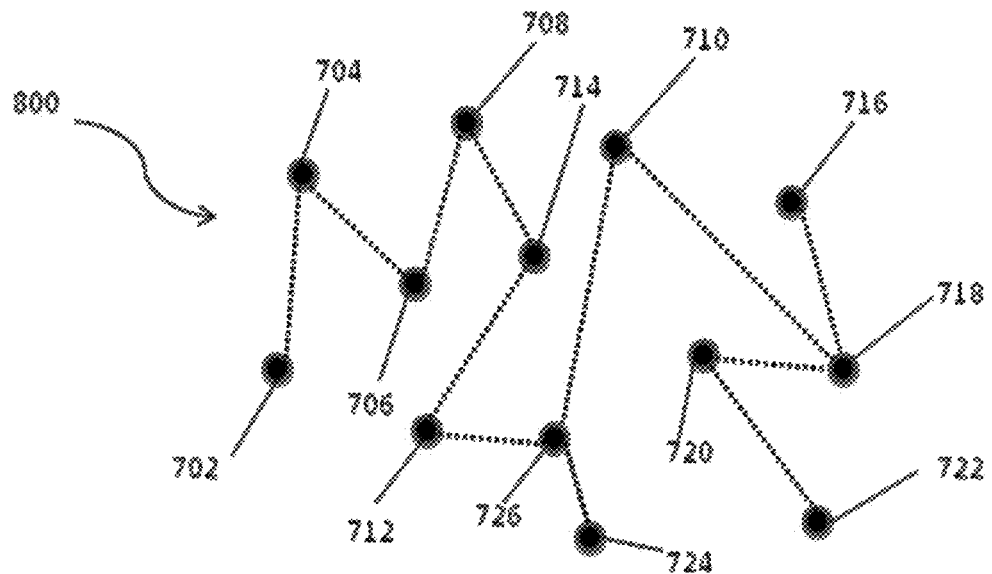
FIG. 8 illustrates a first optimal connection path between the directional, wireless communication nodes of FIG. 7.

FIG. 8 illustrates a first optimal connection topology 800 between the directional, wireless communication nodes of FIG. 7.

As shown in FIG. 8, node 702 is wirelessly connected to node 704, node 704 is wirelessly connected to node 706, node 706 is wirelessly connected to node 708, and node 708 is wirelessly connected to node 714. These connections were established by optimizing a first utility, for example minimizing the communication time between nodes 702 and 714. However, another set of connections may be established by optimizing a different utility, non-limiting examples of which include maximum transmission rates or capacities. This will be described with reference to FIG. 9.

Figure 9:
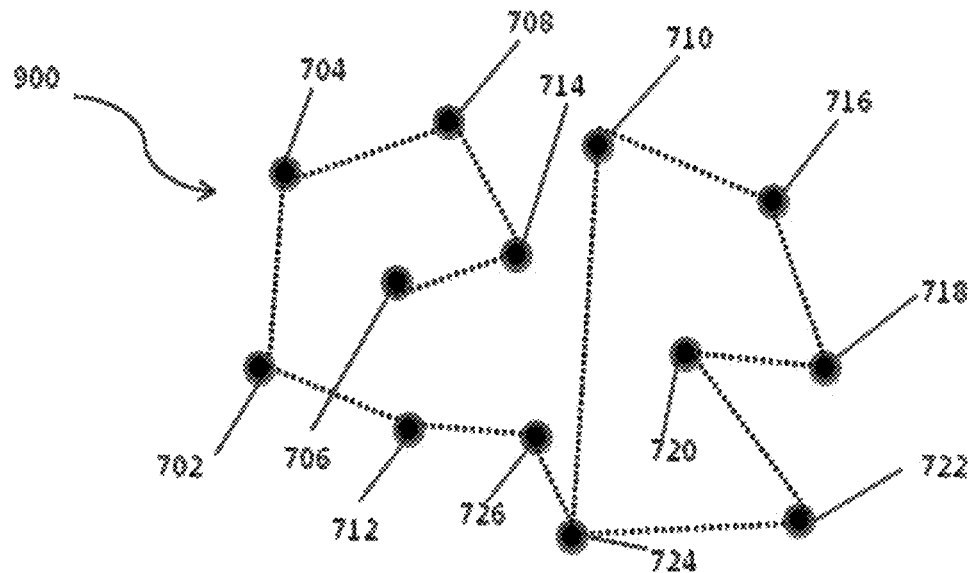
FIG. 9 illustrates a second optimal connection path between the directional, wireless communication nodes of FIG. 7.

FIG. 9 illustrates a second optimal connection topology 900 between the directional, wireless communication nodes of FIG. 7.

As shown in FIG. 9, node 702 is wirelessly connected to node 704, node 704 is wirelessly connected to node 708, node 708 is wirelessly connected to node 714, and node 714 is wirelessly connected to node 706. These connections were established by optimizing a second utility, for example minimizing the amount of power used to transmit information between nodes 702 and 706.

A directional network in accordance with aspects of the present invention, is able to optimize a utility without the need of a single node controlling all other nodes. In particular, each node synthesizes incoming information from neighboring nodes and determines which nodes will provide the best connections based on specific utilities each node is attempting to optimize. Because the actual connections are mutually agreed upon through message exchanges among neighbors, individual nodes may implement optimization based on different utilities. An example node in accordance with aspects of the present invention will now be described with reference to FIG. 10.

Figure 10:
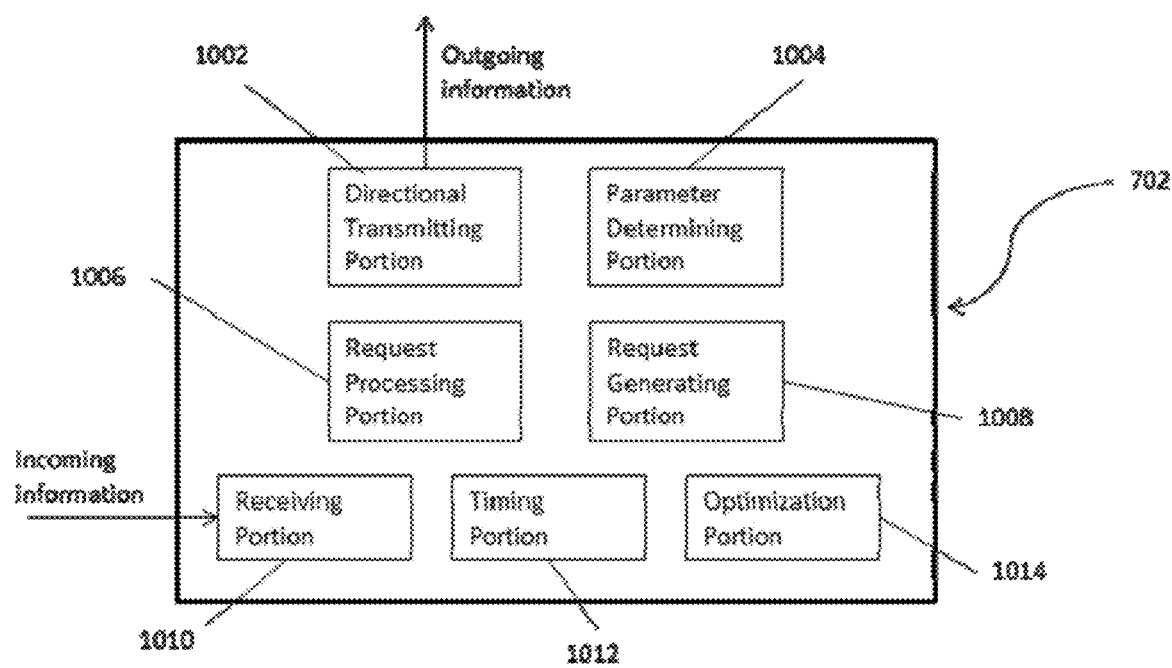
FIG. 10 illustrates different portions of a directional, wireless communication node of FIG. 7.

FIG. 10 illustrates different portions of directional, wireless communication node 702 of FIG. 7.

As shown in FIG. 10, node 702 includes directional transmitting portion 1002, parameter determining portion 1004, request processing portion 1006, request generating portion 1008, receiving portion 1010, timing portion 1012 and optimization portion 1014. In this example, directional transmitting portion 1002, parameter determining portion 1004, request processing portion 1006, request generating portion 1008, receiving portion 1010, timing portion 1012 and optimization portion 1014 are shown as individual items. However, in other embodiments, at least two of directional transmitting portion 1002, parameter determining portion 1004, request processing portion 1006, request generating portion 1008, receiving portion 1010, timing portion 1012 and optimization portion 1014 may be combined as a unitary item. Further, in some embodiments, at least one of directional transmitting portion 1002, parameter determining portion 1004, request processing portion 1006, request generating portion 1008, receiving portion 1010, timing portion 1012 and optimization portion 1014 may be implemented as a non-transient, tangible computer-readable media for carrying or having computer-executable instructions or data structures stored thereon. Such non-transient, tangible computer-readable media can be any available media that can be accessed by a general purpose or special purpose computer. Non-limiting examples of non-transient, tangible computer-readable media include physical storage and/or memory media such as random access memory (RAM), read only memory (ROM), electrically erasable programmable read only memory (EEPROM), compact disc read only memory (CD-ROM) or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a non-transient, tangible computer-readable medium. Combinations of the above should also be included within the scope of non-transient, tangible computer-readable media.

Directional transmitting portion 1002 broadcasts outgoing information to other, neighboring nodes. It will broadcast information such as its position, capabilities (such as the number of high-capacity links node 702 can provide) and state (such as neighbor list, number of high-capacity links already established and with whom, and the capacity and utilization of those links).

Receiving portion 1010 receives incoming information from neighboring nodes. It will receive information similar to the information sent from directional transmitting portion 1002, such as position, capabilities and state. Receiving portion 1010 may also receive requests from neighboring nodes to create a communication channel. As a non-limiting example, node 702 may receive incoming information from nodes 704 and 706 of FIG. 7. Parameter determining portion 1004 would then compile that information and determine the value of a first communication channel with node 704 and the value of a second communication channel with node 706.

Optimization portion 1014 evaluates the results from parameter determining portion 1004 and generates a connection instruction based on the optimized communication path. As a non-limiting example, the value of the first communication channel with node 704 may indicate a more optimal connection than the value of the second communication channel with node 706. In this case, optimization portion 1014 would generate an instruction to request a connection with node 704, and the instruction would then go to request generating portion 1008 to generate the connection request that will be sent to node 704 via directional transmitting portion 1002.

Node 702 can also receive requests for creating a communication channel from neighboring nodes. Request processing portion 1006 processes a connection request from a neighboring node, and parameter determining portion 1004 would determine the relative value of the proposed communication channel.

Timing portion 1012 controls the amount of time between actions. For example, timing portion 1012 may control the amount of time a communication channel remains open before evaluating other potential communication channels. As another example, timing portion 1012 may control the amount of time a first potential communication channel is evaluated before moving to evaluate a second potential communication channel.

An example method of operating node 702 will now be described with reference to FIG. 11, which illustrates process 1100 by which, for example, node 702 evaluates the local topology of the surrounding nodes.

Figure 11:
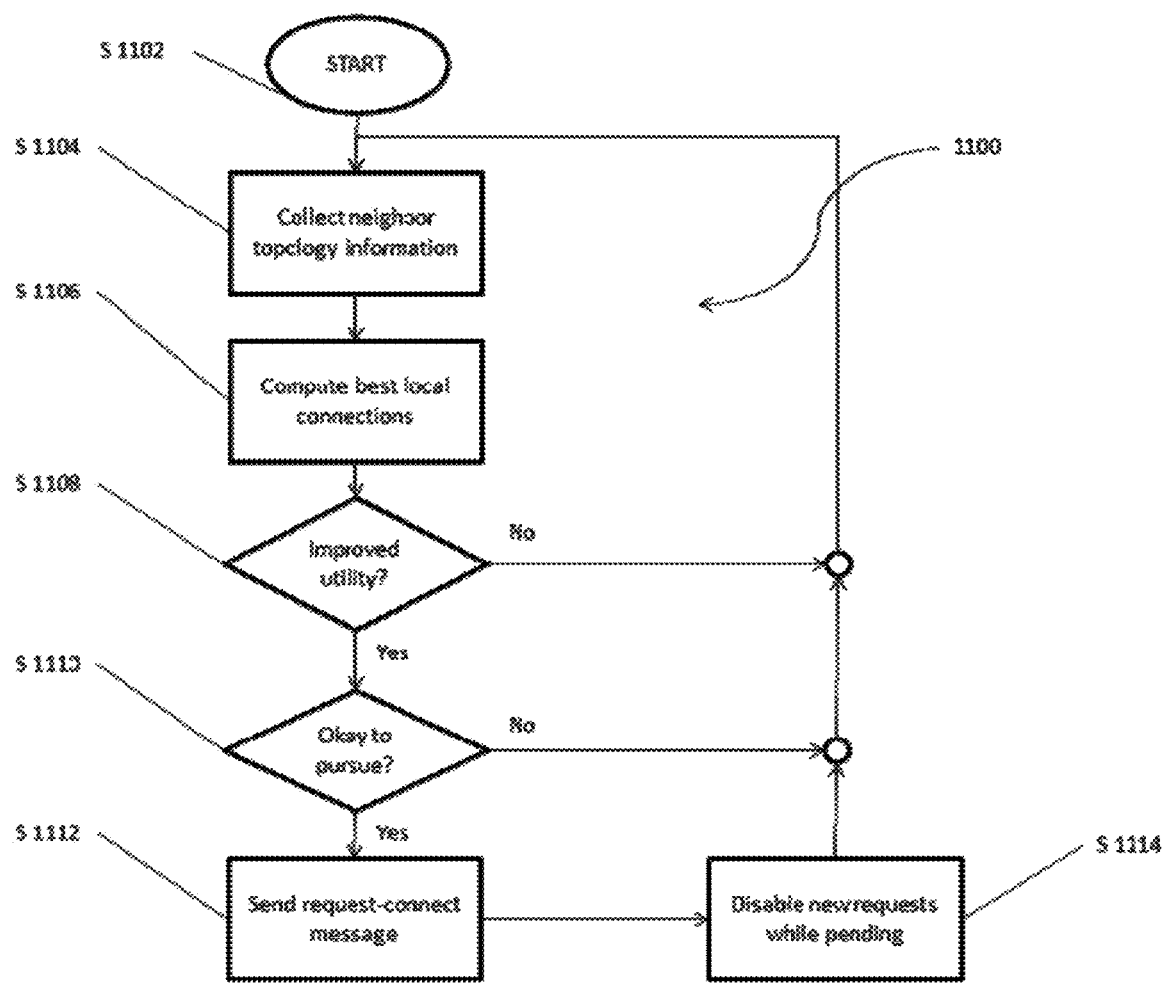
FIG. 11 illustrates a process by which a directional, wireless communication node of FIG. 7 evaluates the local topology of the surrounding nodes.

As shown in FIG. 11, process 1100 starts (S1102) and node 702 begins to collect topology information from neighboring nodes (S1104). A neighboring node is a node that can typically be reached within 1 or 2 hops. In reference to FIG. 7, the neighboring nodes for node 702 include nodes 704, 706, 708, 712, 714 and 726. As described above, the information collected from neighboring nodes may include node position, capabilities and state. In addition, other information may be collected, such as topology evaluations of neighboring nodes, information about neighbors of the neighboring nodes, or information regarding the offer and acceptance/rejection of connections between other neighbors.

After neighbor topology information is collected, node 702 begins to compute the best local connections (S1106). A search engine within node 702 models potential connections based on pre-determined preference rules, and evaluates an objective utility function based on the available information about the neighboring nodes. The search engine outputs the most advantageous connections for node 702. The search engine function will be further described with reference to FIGS. 14-15.

Node 702 then evaluates the utility of the most advantageous connections provided by the search engine output to determine whether or not the new connections will provide improved utility (S1108). The utility is evaluated based on the utility function, which can incorporate many different network characteristics, such as average network connectivity, average path quality, traffic loads, reliability, or other characteristics known in the art.

For example, a utility function, U(T), to determine the expected sum capacity of a network may be represented by the following relationship:

$$U(T) = \sum_{(s,d) \in S} \sum_{B \in B(s,d)} r(P)C(P),$$

where $(s,d) \in S$ represents a source-destination pair of nodes within S, the total set of source-destination node pairs under evaluation. $P \in P(s,d)$ represents a path P among the complete set of paths P(s,d) between a source-destination pair of nodes.

The overall path reliability, r(P), is represented by the following relationship:

$$r(P) = \prod_{t=1}^{|P|} p\{n_{t-1}(P), n_t(P)\},$$

where $p\{n_{t-1}(P), n_t(P)\}$ is the probability of a viable link between node $n_{t-1}$ and node $n_t$, and |P| denotes the number of links in the path.

The link reliability may be based on the distance and geometry between the two nodes, past history in establishing directional connections between the two nodes, or some combination of these and other criteria. For example, in one preferred embodiment of the invention, the reliability might be rated low if the range between the two nodes is close to the maximum communication range or if the geometry indicates that the link might be short-lived due to imminent blockage by terrain, buildings, or trees. The reliability might also be rated low, in another preferred embodiment of the invention, if the neighbor has rejected several connection offers in the past so is likely to reject a future offer. In this preferred embodiment of the invention, the derating of a link's reliability in accordance with its offer acceptance/rejection history is an effective means of resolving preference triangles in which, for example, node A prefers node B, node B prefers node C, but node C prefers node A. By continually derating the link reliability as offers are rejected—for example, reducing the reliability by 10% each rejection in one preferred embodiment of the invention—node A might eventually prefer node C to node B, allowing the link between nodes A and C to stabilize while freeing node B to seek other profitable connections. In this preferred embodiment of the invention, link reliabilities that have been driven low by past rejections might be allowed to return to normal when a connection offer is received from that neighbor. This would allow, for example, node A to accept an eventual offer from node B, after a long history of node B rejecting node A's offers. The capacity of the connection determined by the relationship above, C(P), can be computed as the minimum capacity along any of the individual links, and may be represented by the following relationship:

$$C(P) = \min_{t=1,S...P} C\{n_{t-1}(P), n_t(P)\},$$

where $C\{n_{t-1}(P), n_t(P)\}$ is the capacity of the link between node $n_{t-1}$ and node $n_t$.

While the above example details a single utility function that is used to find the optimal topology, it is possible to include multiple utility functions associated with different optimization criteria. As a non-limiting example, the multiple utility functions could be combined in a weighted average to select a preferred topology.

If none of the potential connections provide an improved utility (S1108), then no potential connections are pursued, and the process may begin again by collecting neighbor topology information (S1104).

If one or more of the potential connections provide an improved utility (S1108), then connections that provide a higher utility than current connections will be pursued (S1110).

A request-connect message is then sent (S1112) to the node or nodes that will provide an improved utility, and any new requests are disabled while the request-connect message is pending (S1114).

An example method of the evaluation of a request-connect message will now be described with reference to FIG. 12.

Figure 12:
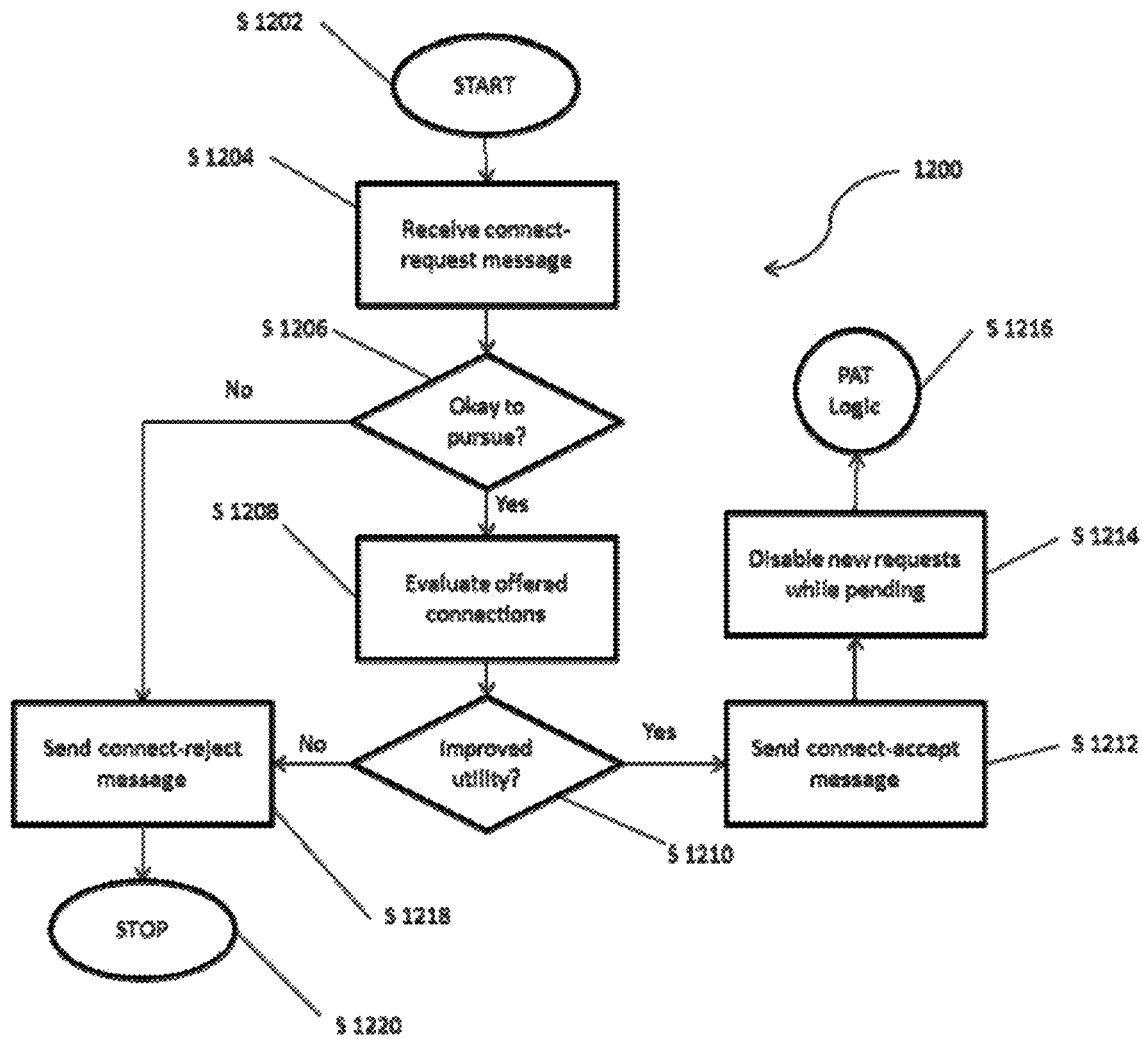
FIG. 12 illustrates a process by which a directional, wireless communication node of FIG. 7 evaluates whether or not to connect with a neighboring node.

FIG. 12 illustrates a process 1200 by which a directional, wireless communication node of FIG. 7 evaluates whether or not to connect with a neighboring node. For example, node 706 may have received a request-connect message from node 702, and the request-connect message must be evaluated.

As shown in FIG. 12, process 1200 starts (S1202) and node 706 receives the connect-request message (S1204) from node 702. If node 706 determines it is not okay to pursue the connection (S1206), then a connect-reject message is sent (S1218) and process 1200 is stopped (S1220). Node 706 may determine it is not okay to pursue the connection, for example, because it may have reached its maximum number of connections already.

If node 706 determines it is okay to pursue the connection (S1206), then the offered connection from node 702 is evaluated (S1208) to determine utility value of the connection based on the utility function for node 706. The utility function may be similar to the function described above; however it may also be a different function. If the connection does not offer sufficiently improved utility (S1210) then a connect-reject message is sent (S1218) and process 1200 is stopped (S1220).

In general, a settled node will accept all invitations. A settled node is a node in which the number of physical connections available to it is less than or equal to the total number of connections it can support. Thus, a new connection available to a settled node will provide improved utility to the node because it is providing utility where there was previously no utility. A settled link is a link in which both nodes are settled.

An unsettled node will not necessarily accept all invitations. An unsettled node is a node in which the number of physical connections available to it is greater than the total number of connections it can support. Thus, a new connection available to an unsettled node will only be accepted if it offers sufficiently improved utility over that of its current connections. An unsettled link is a link in which one or both of the nodes is unsettled.

If the connection offers sufficiently improved utility (S1210) then a connect-accept message is sent (S1212) to node 702. While the connection is still pending, all new requests that would require the pending connection to be dropped are disabled (S1214). When the connect-accept message is received by node 702, pointing, acquisition and tracking (PAT) logic processing is initiated (S1216). PAT processing (S1216) will be further described with reference to FIG. 13.

Figure 13:
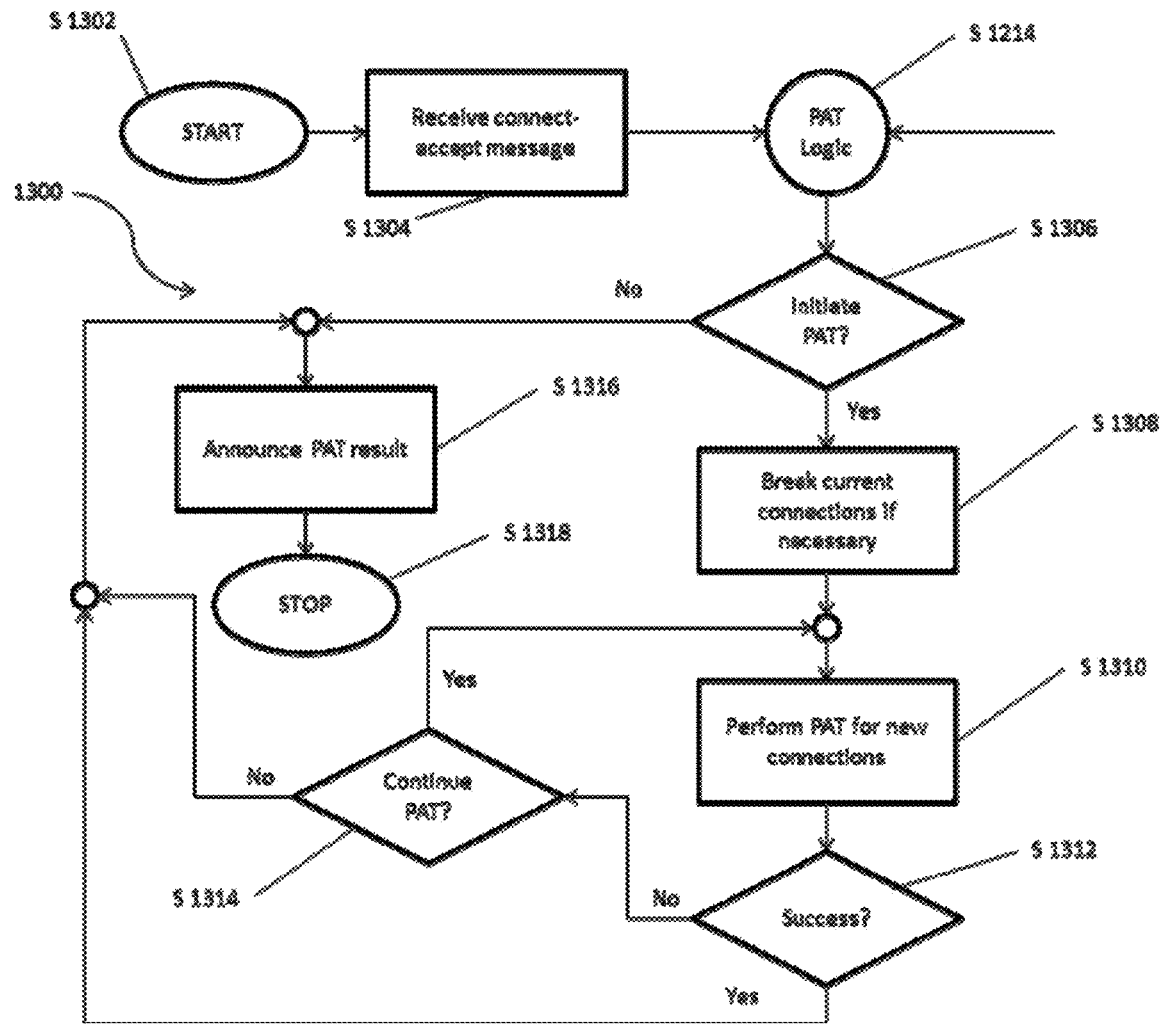
FIG. 13 illustrates a process by which a directional, wireless communication node of FIG. 7 connects with a neighboring node after receiving acceptance.

FIG. 13 illustrates a process 1300 by which a directional, wireless communication node of FIG. 7 connects with a neighboring node after receiving acceptance. For example, node 702 may have received a connect-accept message from node 706, and the connection between the two nodes must be closed.

As shown in FIG. 13, process 1300 starts (S1302) and node 702 receives the connect-accept message (S1304) from node 706. Pointing, acquisition, and track (PAT) logic processing is then initiated (S1214) and nodes 702 and 706 determine whether or not to initiate PAT between the nodes (S1306). If the determination is made not to initiate PAT (S1306) then the PAT failure result is announced (S1316) and process 1300 is stopped (S1318).

If the determination is made to initiate PAT (S1306) then nodes 702 and 706 will break any other connections necessary (S1308) to enable their connection. PAT is then performed for the new connection between nodes 702 and 706 (S1310). If PAT is not successful (S1312) then the decision needs to be made as to whether or not to continue PAT. If PAT is not continued (S1314) the PAT failure result is announced (S1316) and process 1300 is stopped (S1318).

If PAT is continued (S1314), PAT is performed again (S1310) and evaluated for success (S1312). If PAT is not successful again, the decision will again be made whether or not to continue PAT (S1314). This loop will continue until either PAT is successful or is discontinued for the proposed connection.

If PAT is successful (S1312), the PAT success is announced (S1316), nodes 702 and 706 are connected, and process 1300 is stopped (S1318) for the communication channel between nodes 702 and 706.

Figure 14:
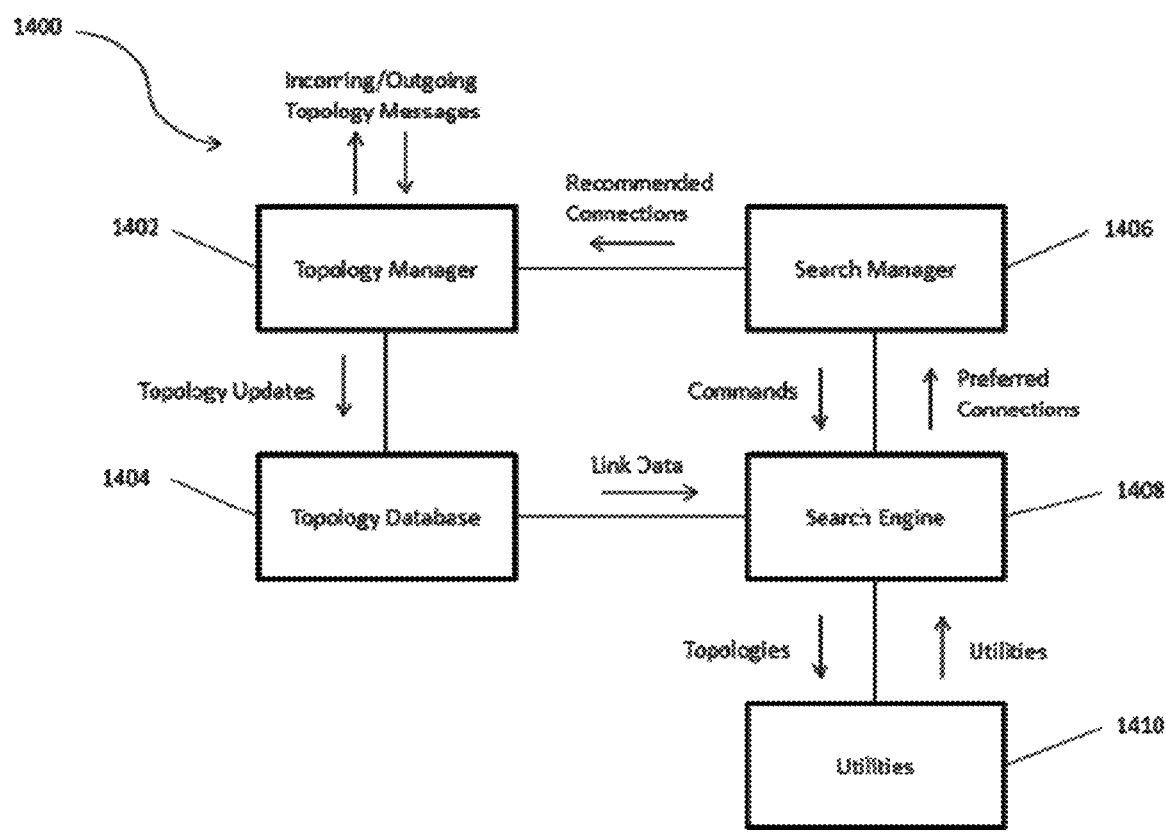
FIG. 14 illustrates the topology management architecture of a node within the network of directional, wireless communication nodes of FIG. 7.

FIG. 14 illustrates the topology management architecture 1400 of a node within the network of directional, wireless communication nodes of FIG. 7. As shown in FIG. 14, within each node is a topology manager 1402 that processes incoming messages about the topology of the surrounding nodes and broadcasts messages about its own topology. The information within the topology manager is used to provide topology updates to the topology database 1404. Data regarding node connections, or link data, is provided to search engine 1408. Search engine 1408 proposes topology changes, from which the utilities 1410 of those changes are computed. Search engine 1408 then forwards the preferred connections to search manager 1406. Search manager 1406 also provides search engine 1408 with command updates regarding search strategy, and it provides topology manager 1402 with the recommended connections. Architecture 1400 provides each node the ability to continuously update information regarding local topology and make decisions about which nodes will provide the highest utility for a connection.

FIG. 14 is a general view of the way information flows within a directional, wireless communication node. In comparing FIG. 14 to FIG. 10, topology manager 1402 comprises directional transmitting portion 1002 and receiving portion 1010 and topology database 1402 comprises parameter determining portion 1004 and optimization portion 1014. Search manager 1406, search engine 1408 and utilities 1410 comprise request processing portion 1006 and request generating portion 1008.

Figure 15:
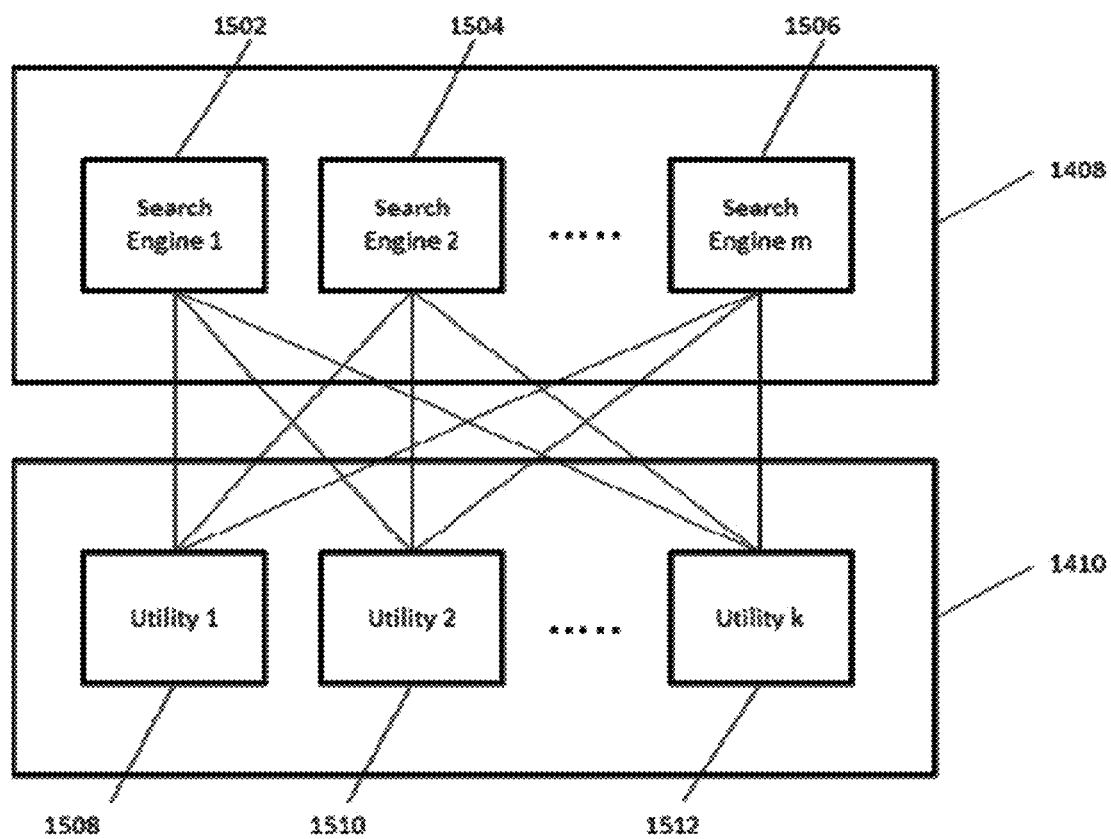
FIG. 15 illustrates a more detailed relationship between the search engine and utilities of FIG. 14.

FIG. 15 illustrates a more detailed relationship between search engine 1408 and utilities 1410 of FIG. 14. As shown in FIG. 15, Search engine 1408 may actually comprise multiple search engines 1502, 1504, and 1506 implementing different search methodologies run simultaneously. For example, search engines 1502, 1504 and 1506 may employ different search strategies regarding topology changes they are allowed to consider or the network information they are allowed to use. The results of the searches may be compared against utility 1410, which may comprise multiple utilities 1508, 1510 and 1512.

Actual search methodologies may change based on the number of unsettled nodes and links. If the number of unsettled nodes and links is small, search engine 1408 could perform an exhaustive search of all possible connections and select an optimal network topology with maximum utility 1410.

If an exhaustive search cannot be performed, then random search techniques could be applied. For example, in an undirected search, the possible network topologies are sampled randomly, taking into account preferences among the nodes and links. The best configurations among those sampled would determine the recommended connection or connections to seek. As another example, a directed random search could be employed using such heuristic algorithms as simulated annealing, genetic algorithms, and others known in the art. These algorithms have been shown to be very effective in providing near-optimal solutions for many topological and resource allocation problems.

Exemplary embodiments of the present invention include a system and method by which a network of directional, wireless nodes that are not fixed in space can be optimized by optimizing each node individually. In a preferred embodiment, the network does not have a central control node, so each node is responsible for optimizing its surrounding topology. This is accomplished by synthesizing incoming information from neighboring nodes and determining which nodes will provide the best connections based on specific utilities each node is attempting to optimize.

The directionality of this type of network provides for a constantly changing topology, since the nodes can move in space, and the direction in which the signal from each node is broadcast changes as well. Therefore, a node goes through a cyclic process of surveying its surroundings, making new connections and breaking old connections based on updated information, then beginning the process again by surveying its surroundings.

The foregoing description of various exemplary and preferred embodiments has been presented for purposes of illustration and description. It is not intended to be exhaustive or to limit the invention to the precise forms disclosed, and many modifications and variations are possible in light of the teachings herein. It will be understood that various modifications may be made to the embodiments disclosed herein. Therefore, the above description should not be construed as limiting the scope of the invention, but merely as illustrating exemplifications of preferred embodiments. Those skilled in the art will readily envision other modifications within the scope and spirit of the present invention as defined by the appended claims.

What is claimed is:

1. A directional communication node for use with a first communication node and a second communication node, the directional communication node comprising a directional, wireless node that broadcasts its signal with directionality, such that another node must be within a radius that is less than 360 degrees, and within the broadcast area, in order to receive the signal, the first communication node being located at a first position and being operable to transmit first topology information related to the first communication node, the second communication node being located at a second position and being operable to transmit second topology information related to the second communication node, said directional communication node comprising:

a directional transmitting portion operable to transmit a first output signal with directionality in a first direction toward the first communication node and to output a second output signal with directionality in a second direction toward the second communication node, the transmission of the first output signal with directionality being defined by a first transmission radius that is less than 360 degrees and includes at least the first position, the transmission of the second output signal with directionality being defined by a second transmission radius that is less than 360 degrees and includes at least the second position;

a receiving portion operable to receive the first topology information and the second topology information;

a parameter determining portion operable to determine a first communication channel value and a second communication channel value, the first communication channel value being based on the first topology information, the second communication channel value being based on the second topology information;

an optimization portion operable to determine an optimized communication path based on the first communication channel value and the second communication channel value;

a request processing portion, wherein said receiving portion is further operable to receive a connect request message from another of the second communication node or the first communication node, wherein said request processing portion is operable to generate an evaluation of an establishment of a second communication channel with the other of the second communication node or the first communication node, the evaluation being based on the first topology information and the second topology information, wherein said optimization portion is operable to generate a connection instruction based on the evaluation, and wherein said directional transmitting portion is further operable to establish the second communication channel based the connection instruction; and a timing portion operable to establish a predetermined time period, wherein said directional transmitting portion is further operable to maintain the first communication channel for the predetermined period frame before establishing the second communication channel, wherein said optimization portion is operable to generate a connection instruction based on the optimized communication path, and wherein said directional transmitting portion is further operable to establish a first communication channel with one of the first communication node and the second communication node based on the connection instruction.

2. The directional communication node of claim 1, further comprising: a request generating portion operable to generate a connect request message, wherein said directional transmitting portion is further operable to transmit the connect request message to the first communication node based on the connection instruction.

3. The directional communication node of claim 2, further comprising: a timing portion operable to establish a predetermined time period, wherein said directional transmitting portion is further operable to maintain the first communication channel for the predetermined time period.

4. A method of communicating using a first communication node and a second communication node from a directional communication node comprising a directional, wireless node that broadcasts its signal with directionality, such that another node must be within a radius that is less than 360 degrees, and within the broadcast area, in order to receive the signal, the first communication node being located at a first position and being operable to transmit first topology information related to the first communication node, the second communication node being located at a second position and being operable to transmit second topology information related to the second communication node, said method comprising:
transmitting, via a directional transmitting portion, a first output signal with directionality in a first direction toward the first communication node, the transmission of the first output signal with directionality being defined by a first transmission radius that is less than 360 degrees and includes at least the first position;
transmitting, via the directional transmitting portion, a second output signal with directionality in a second direction toward the second communication node, the transmission of the second output signal with directionality being defined by a second transmission radius that is less than 360 degrees and includes at least the second position;
receiving, via a receiving portion, the first topology information and the second topology information;
determining, via a parameter determining portion, a first communication channel value and a second communication channel value, the first communication channel value being based on the first topology information, the second communication channel value being based on the second topology information;
determining, via an optimization portion, an optimized communication path based on the first communication channel value and the second communication channel value;
generating, via the optimization portion, a connection instruction based on the optimized communication path;
establishing, via the directional transmitting portion, a first communication channel with one of the first communication node and the second communication node based on the connection instruction;
receiving, via the receiving portion, a connect request message from another of the second communication node or the first communication node; generating, via a request processing portion, an evaluation of an establishment of a second communication channel with the other of a second communication node or the first communication node, the evaluation being based on the first topology information and the second topology information; generating, via the optimization portion, a connection instruction based on the evaluation; and establishing, via the directional transmitting portion, the second communication channel based the connection instruction; and
establishing, via a timing portion, a predetermined time period; and maintaining, via the directional transmitting portion, the first communication channel for the predetermined time period.

5. The method of claim 4, further comprising: generating, via a request generating portion, a connect request message; and transmitting, via the directional transmitting portion, the connect request message to the first communication node based on the connection instruction.

6. The method of claim 5, further comprising: establishing, via a timing portion, a predetermined time period; and maintaining, via the directional transmitting portion, the first communication channel for the predetermined time period.

7. A non-transitory, tangible, computer-readable media having computer-readable instructions stored thereon, the computer-readable instructions being capable of being read by a computer to be used with a first communication node and a second communication node from a directional communication node comprising a directional, wireless node that broadcasts its signal with directionality, such that another node must be within a radius that is less than 360 degrees, and within the broadcast area, in order to receive the signal, the first communication node being located at a first position and being operable to transmit first topology information related to the first communication node, the second communication node being located at a second position and being operable to transmit second topology information related to the second communication node, the computer-readable instructions being capable of instructing the computer to perform the method comprising:
transmitting, via a directional transmitting portion, a first output signal with directionality in a first direction toward the first communication node, the transmission of the first output signal with directionality being defined by a first transmission radius that is less than 360 degrees and includes at least the first position;
transmitting, via the directional transmitting portion, a second output signal with directionality in a second direction toward the second communication node, the transmission of the second output signal with directionality being defined by a second transmission radius that is less than 360 degrees and includes at least the second position;
receiving, via a receiving portion, the first topology information and the second topology information;
determining, via a parameter determining portion, a first communication channel value and a second communication channel value, the first communication channel value being based on the first topology information and a predetermined parameter, the second communication channel value being based on the second topology information and the predetermined parameter;
determining, via an optimization portion, an optimized communication path based on the first communication channel value and the second communication channel value;
generating, via the optimization portion, a connection instruction based on the optimized communication path;
establishing, via directional transmitting portion, the first communication channel based the connection instruction;

receiving, via the receiving portion, a connect request message from another of the second communication node or the first communication node; generating, via a request processing portion, an evaluation of an establishment of a second communication channel with the other of the second communication node or the first communication node, the evaluation being based on the first topology information and the second topology information; generating, via the optimization portion, a connection instruction based on the evaluation; and establishing, via the directional transmitting portion, the second communication channel based the connection instruction; and establishing, via a timing portion, a predetermined time period; and maintaining, via the directional transmitting portion, the first communication channel for the predetermined time period.

8. The non-transitory, tangible, computer-readable media of claim 7, the computer-readable instructions being capable of instructing the computer to perform said method further comprising: generating, via a request generating portion, a connect request message; and transmitting, via the directional transmitting portion, the connect request message to the first communication node based on the connection instruction.

9. The non-transitory, tangible, computer-readable media of claim 8, the computer-readable instructions being capable of instructing the computer to perform said method further comprising: establishing, via a timing portion, a predetermined time period; and maintaining, via the directional transmitting portion, the first communication channel for the predetermined time period.

* * * * *